(12) United States Patent
Ungureanu et al.

(10) Patent No.: US 8,329,239 B2
(45) Date of Patent: Dec. 11, 2012

(54) OFF-TASTE MASKING

(75) Inventors: Ioana Maria Ungureanu, Cincinnati, OH (US); Esther Van Ommeren, Lelystad (NL)

(73) Assignee: Givandan S.A., Vernier (CH)

( * ) Notice: Subject to any disclaimer, the term of this patent is extended or adjusted under 35 U.S.C. 154(b) by 394 days.

(21) Appl. No.: 12/713,752

(22) Filed: Feb. 26, 2010

(65) Prior Publication Data

US 2010/0227039 A1 Sep. 9, 2010

Related U.S. Application Data

(60) Provisional application No. 61/157,008, filed on Mar. 3, 2009.

(51) Int. Cl.
*A23L 1/226* (2006.01)

(52) U.S. Cl. .................. 426/536; 426/534; 426/548

(58) Field of Classification Search .................. 426/534, 426/536
See application file for complete search history.

(56) References Cited

U.S. PATENT DOCUMENTS

| | | | |
|---|---|---|---|
| 3,625,976 A * | 12/1971 | Theimer ............. | 549/289 |
| 3,712,947 A * | 1/1973 | Theimer ............. | 424/59 |
| 5,144,048 A | 9/1992 | Christensen et al. | |
| 5,921,247 A | 7/1999 | Anderson | |
| 6,123,974 A | 9/2000 | Gautschi et al. | |
| 6,194,019 B1 | 2/2001 | Anderson | |
| 8,044,094 B2 * | 10/2011 | De Saizieu et al. ............ | 514/452 |
| 2003/0003212 A1 | 1/2003 | Chien et al. | |
| 2004/0213881 A1 | 10/2004 | Chien et al. | |
| 2008/0226776 A1 | 9/2008 | Roy et al. | |
| 2009/0163545 A1 * | 6/2009 | Goldfarb ............. | 514/312 |

FOREIGN PATENT DOCUMENTS

| | | |
|---|---|---|
| WO | WO 02/100192 A1 | 12/2002 |
| WO | WO 2008/112979 A1 | 9/2008 |
| WO | WO 2008/119196 A1 | 10/2008 |
| WO | WO 2008/119197 A1 | 10/2008 |
| WO | WO 2009/015504 A2 | 2/2009 |
| WO | WO 2009077173 A2 * | 6/2009 |
| WO | WO 2009/140784 A1 | 11/2009 |
| WO | WO 2009/149577 A1 | 12/2009 |

OTHER PUBLICATIONS

Shilin, S.V., Garzad, M.M., Khilya, V.P. 2008. "Synthesis of dipeptide derivatives of 3,4-substituted 7-hydroxycoumarins." Chemistry of Natural Compunds. vol. 44. pp. 301-305.*
Ley, Jakob P., et al., "New Bitter-Masking Compounds: Hyroxylated Benzoic Acid Amides of Aromatic Amines as Structural Analogues of Homoeriodictyol", Journal of Agricultural Food Chemistry, 2006, vol. 54, pp. 8574-8579.

* cited by examiner

*Primary Examiner* — Nikki H Dees
(74) *Attorney, Agent, or Firm* — Curatolo Sidoti Co., LPA; Joseph G. Curatolo; Salvatore A. Sidoti

(57) ABSTRACT

A method of masking the off-taste of an artificial or natural sweetener, comprising the addition to the sweetener of at least one compound according to the formula I

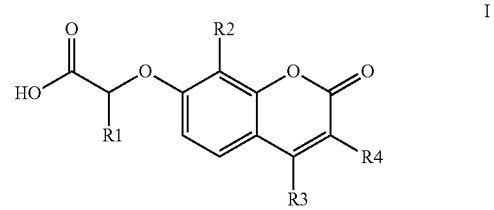

in which R1 is selected from H, $C_1$-$C_4$ alkyl and Ph:

R2 is selected from H and Me:

R3 is selected from H, $C_1$-$C_4$ alkyl and Ph:

R4 is selected from H and $C_1$-$C_4$ alkyl:

or R3, R4 together form a five, six or seven-membered aliphatic ring.

4 Claims, No Drawings

OFF-TASTE MASKING

This application claims the benefit under 35 U.S.C. 119(e) of U.S. Provisional Application for Patent Ser. No. 61/157,008, filed Mar. 3, 2009, incorporated herein by reference.

This disclosure relates to the masking of off-tastes, particularly in relation to sweeteners.

Sweeteners, both natural and artificial, have been widely used in place of sugar (sucrose) by calorie-conscious consumers for some time. Many have the considerable advantage of being considerably sweeter than sugar, while lacking its calorific content. However, in addition to the sweet sensation, many also introduce a problem not encountered with sugar use, an off-taste, unpleasant in character and sometimes characterised as bitter, lingering, metallic. This off-taste often results in consumer resistance to such sweeteners. As a result, there has been increasing interest in materials that are capable of blocking this off-taste. A typical example of this may be found in the paper of Ley et al (J. Agr. Food Chem. 54(22), 8574-8579 (2006)).

There have been attempts to commercialise off-taste maskers, but these have generally suffered from one or both of general ineffectiveness and expense. The few materials that have made it on to the market have been mixtures marketed as "flavor improvers" and have limited effectiveness.

It has now been found that certain compounds are capable of masking the off-taste of such sweeteners to an unexpected and highly desirable degree. There is therefore provided a method of masking the off-taste of a sweetener, comprising the addition to the sweetener of at least one compound according to the formula I

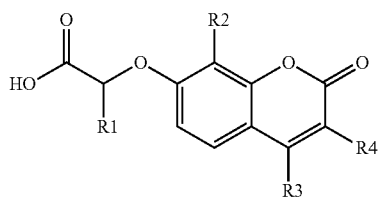

in which
R1 is selected from H, $C_1$-$C_4$ alkyl and Ph;
R2 is selected from H and Me:
R3 is selected from H, $C_1$-$C_4$ alkyl and Ph;
R4 is selected from H and $C_1$-$C_4$ alkyl;
or R3, R4 together form a five, six or seven-membered aliphatic ring.

In a particular embodiment,
R1 is selected from H, Me and Ph:
R2 is selected from H and Me:
R3 is selected from H, Me, Pr, and Ph;
R4 is selected from H and Me:
or R3 and R4 together form a five-or six-membered aliphatic ring.

All of these compounds are available from commercial suppliers of fine chemicals, such as ChemBridge Corp. and Aurora Fine Chemicals LLC, both of San Diego Calif.

Alternatively, they may easily be made by known synthetic methods. Examples of these methods may be found in, for example, Chimichi et al (Tetrahedron 58(24), 4851-4858 (2006)) and Leonetti et al (J. Med. Chem. 4727), 6792-6803 (2004)). The skilled person can readily adapt such methods to all cases.

Specific examples of compounds include the following specific (but non-limiting) cases:

| Compound No. | $R^1$ | $R^2$ | $R^3$, $R^4$ |
|---|---|---|---|
| 1 | Me | Me | Me, Et |
| 2 | Me | Me | Cyclopentyl |
| 3 | Ph | Me | Ph, H |
| 4 | Ph | Me | Cyclohexyl |
| 5 | Ph | H | Cyclohexyl |
| 6 | Ph | H | Cyclopentyl |
| 7 | H | Me | Me, Et |
| 8 | Ph | H | Me, Me |
| 9 | Ph | Me | Pr, H |
| 10 | H | H | Me, H |
| 11 | Me | H | Me, Me |
| 12 | H | H | Me, Me |
| 13 | H | H | Cyclohexyl |
| 14 | H | H | Me, Et |
| 15 | Ph | Me | Cyclopentyl |
| 16 | Me | H | Cyclopentyl |

As used herein, Me is methyl, Et is ethyl, Pr is propyl, and Ph is phenyl.

Particular examples are compounds 1, 2, and 7.

More than one such compound may be used.

The compounds have a masking effect that is vastly superior to any other such effect known to the art.

The compounds may be used in conjunction with any known artificial or natural sweetener to ameliorate the off-taste of such sweeteners. There is therefore provided a sweetener of reduced off-taste, comprising an off-taste reducing quantity of at least one compound as hereinabove described. The compound may simply be added to a composition which also contains the artificial sweetener. In a particular embodiment, a compound may be blended with the artificial sweetener prior to addition of the sweetener to a composition.

The proportion of compound used will depend on the sweetener, the compound, the use to which the sweetener will be put, and the effect desired. This means that the proportion may vary between very wide limits. The skilled person can easily determine an appropriate proportion in every case, using only routine experimentation and the ordinary skill of the art. However, as a general, non-limiting guideline, the proportion of compound may vary between 0.5 ppm and 40 ppm, more particularly in certain embodiments, between about 1 ppm and about 10 ppm of the consumable product.

Non-limiting examples of artificial sweeteners include saccharin, sucralose, AceK™ and Neotame™. Non-limiting examples of natural sweeteners include tevioside, swingle extract, glyccerhizin, perillartine, naringin dihydrochalcone, neohesperidine dihydrochalcone, mogroside V, rubusoside, rubus extract, and rebaudioside A.

The off-taste-reduced sweeteners hereinabove described may he used in all of the normal consumable products and oral care products to which such sweeteners are added. By "consumable product" is meant any product that is taken orally, either for swallowing or merely for local use in the mouth, and which contains sufficient sweetener to cause an off-taste.

Typical examples of consumable products, include, but not limited to, all food products, food additives, nutraceuticals, pharmaceuticals and any product placed in the mouth including chewing gum, oral care products, and oral hygiene products including but not limited to, cereal products, rice products, tapioca products, sago products, baker's products, biscuit products, pastry products, bread products, confectionery products, dessert products, gums, chewing gums, flavored or flavor-coated straws, flavor or flavor-coated food/beverage containers, chocolates, ices, honey products, treacle products, yeast products, baking-powder, salt and spice products, savoury products, mustard products, vinegar products, sauces (condiments), tobacco products, cigars, cigarettes, processed foods, cooked fruits and vegetable products, meat and meat products, jellies, jams, fruit sauces, egg products, milk and dairy products, yoghurts, cheese products, butter and butter substitute products, milk substitute products, soy products, edible oils and fat products, medicaments, beverages, carbonated beverages, alcoholic drinks such as beers, wines and spirits, non-alcoholic drinks such as soft drinks, mineral and aerated waters, fruit drinks, fruit juices, coffee, artificial coffee, tea, cocoa, including forms requiring reconstitution including, without limitation, beverage powder, milk based beverage powder, sugar-free beverage powder, beverage syrup, beverage concentrate, instant coffee, instant tea, instant cocoa, and coffee whitener, food extracts, plant extracts, meat extracts, condiments, gelatins, pharmaceutical and non-pharmaceutical gums, tablets, lozenges, drops, emulsions, elixirs, syrups and other preparations for making beverages, and combinations thereof.

Oral care products, by which is meant any product applied to or taken into the oral cavity for the purposes of cleaning, freshening, healing, deodorising the cavity or any part thereof, may include, but are not limited to, toothpastes, tooth gels, tooth powders, tooth whitening products, mouthwashes, lozenges, dental floss, toothpicks, anti-plaque and anti-gingivitis compositions, throat lozenges, throat drops, inflammatory compositions, compositions for treatment of nasal symptoms, cold symptoms and upper gastrointestinal tract distress, compositions for cold relief, for alleviating discomfort of hot flash, and gargle compositions.

The disclosure is further described with reference to the following non-limiting example.

EXAMPLE

Testing of Compounds:

Compounds 1 and 2 in the table above (both ex Chem-Bridge Corp. San Diego Calif.) are tested by a taste panel of 10 panelists sensitive to bitter taste. Suitability of a panelist is assessed by his or her reaction to a series of aqueous saccharin solutions at concentrations of 1 mM, 3 mM and 7 mM. People who find these bitter (about 30-50% of the population) are suitable as panelists. The tests involve both simple aqueous solutions of sweeteners in water and actual products. The results are as follows (the compound number refers to the table above):

Compound 1
 Used at 10 ppm, it is found to block significantly the off-notes of a sucralose solution in water (0.08 gr/l).
 Used at 10 ppm, it is found to block significantly the off-notes of an aspartame solution in water (0.2 gr/l).
 Used at 10 ppm, it is found to block significantly the off-notes of a Rebaudioside solution in water (250 ppm in water).

Compound 2:
 Used at 10 ppm, it is found to block significantly the off-notes of a sucralose solution in water (0.05 gr/l).
 Used at 10 ppm, it is found to block significantly soy milk off-notes (beany notes and bitter). The soy milk also has increased creaminess.
 Used at 10 ppm, it is found to block significantly coffee bitterness.
 Used at 10 ppm it was found to block significantly the off-notes of a Rebaudioside solution in water (60 ppm and 250 ppm).

Although the embodiments have been described in detail through the above description and the preceding examples, these examples are for the purpose of illustration only and it is understood that variations and modifications can be made by one skilled in the art without departing from the spirit and the scope of the disclosure. It should be understood that the embodiments described above are not only in the alternative, but can be combined.

We claim:

1. A method of masking the off-taste of a sweetener, comprising the addition to the sweetener of at least one compound according to formula I

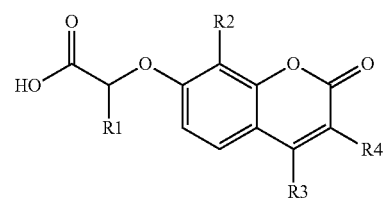

in which
R1 is selected from H, $C_1$-$C_4$ alkyl and Ph;
R2 is selected from H and Me;
R3 is selected from H, $C_1$-$C_4$ alkyl and Ph;
R4 is selected from H and $C_1$-$C_4$ alkyl;
or R3, R4 together form a five, six or seven-membered aliphatic ring.

2. A method according to claim 1, in which
R1 is selected from H, Me and Ph;
R2 is selected from H and Me;
R3 is selected from H, Me, Pr and Ph;
R4 is selected from H and Me;
or R3 and R4 together form a five-or six-membered aliphatic ring.

3. A method according to claim 1, in which R1, R2, R3 and R4 are selected according to the following criteria:

| $R^1$ | $R^2$ | R3, R4 |
| --- | --- | --- |
| Me | Me | Me, Et |
| Me | Me | Cyclopentyl |
| H | Me | Me, Et. |

4. A sweetener of reduced off taste, comprising a sweetener and an off-taste reducing quantity of at least one compound according to formula I

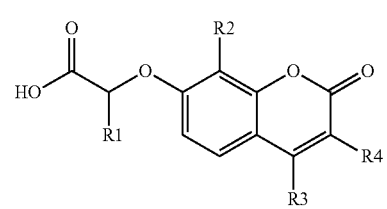

in which
R1 is selected from H, $C_1$-$C_4$ alkyl and Ph;

R2 is selected from H and Me;
R3 is selected from H, $C_1$-$C_4$ alkyl and Ph;
R4 is selected from H and $C_1$-$C_4$ alkyl; or R3, R4 together form a five, six or seven-membered aliphatic ring.

* * * * *